United States Patent Office 3,494,931
Patented Feb. 10, 1970

3,494,931
1-SUBSTITUTED-3-IMINO-TETRAHYDRO-OXAZOLO(3,4-a)PYRIDINES
Albert J. Frey, Essex Fells, and Robert E. Manning, Mountain Lakes, N.J., assignors to Sandoz Inc., Hanover, N.J.
No Drawing. Filed Oct. 5, 1967, Ser. No. 672,989
Int. Cl. C07d 85/36, 99/02; A61k 27/00
U.S. Cl. 260—294.7                                    5 Claims

ABSTRACT OF THE DISCLOSURE

This disclosure relates to 3-imino-oxazolopyridines. These compounds are useful as hypotensive agents.

---

This invention pertains to novel oxazolopyridines and more particularly, to novel 1-substituted-3-imino-oxazolo-[3,4-a]pyridines. Still more particularly, this invention concerns 1-substituted - 3 - imino - 5,6,7,8 - tetrahydrooxazolo[3,4-a]pyridines, intermediates therefor, and their methods of preparation.

The compounds of this invention may be represented by the formula:

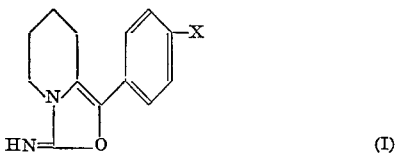

where X is hydrogen or chloro.

The compounds represented by Formula I above are prepared by reaction of a phenyl or substituted phenyl-2-piperidyl ketone and cyanogen bromide, and converting the intermediates thus formed to obtain the compounds of Formula I. The process for obtaining the 3-iminooxazolo pyridines of Formula I is illustrated by the following flow diagram:

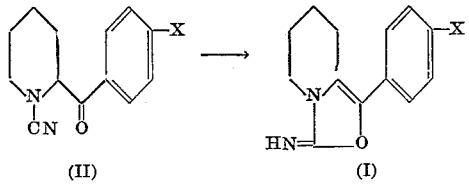

where X is hydrogen or chloro.

The oxazolo pyridines (I) are obtained according to the process depicted above from the ketones of Formula II. The reaction may be performed in the presence or absence of solvent, e.g., an inert organic solvent. Solvents which may be utilized include chlorinated hydrocarbons such as chloroform, tetrahydrofuran, benzene, ether, acetone and the like. Room temperature to 40° C., is preferred as a reaction temperature although temperatures of 0° to 50° C. are satisfactory. Neither the solvent nor the temperature used is critical. The products (I) are readily obtainable from the reaction mixture by conventional recovery techniques such as crystallization, filtration and the like. When the compounds designated (I) are recovered as acid addition salts, they may be converted to the free base by standard techniques, e.g., by admixture with aqueous sodium carbonate and ether and evaporating the ether to obtain the free base.

The ketones represented by Formula II above are prepared as indicated by the following reaction:

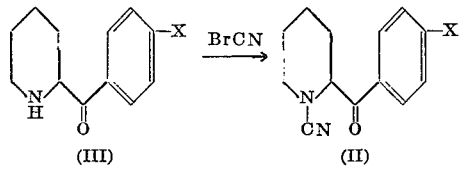

The phenyl pyridyl ketone of Formula III is treated with cyanogen bromide in the presence of a mild base such as an alkali or alkaline earth metal carbonate or bicarbonate, e.g., sodium bicarbonate. The reaction may be run in solvent such as tetrahydrofuran, ether, acetone, lower alkanols such as methanol or ethanol and the like, and aqueous mixtures thereof. The proportion of water and organic solvent is not critical. It is preferred that a two-phase system be utilized. Conveniently, the reaction is conducted at about room temperatures and reaction temperatures of about 0° to 40° C. are perfectly satisfactory. Neither the solvent nor the temperature used is critical in obtaining the compounds (II), and conventional recovery techniques may be utilized.

The starting materials used hereinabove are known in the art and may be prepared from available materials according to methods disclosed in the literature.

The oxazolopyridines of Formula I above are useful because they possess pharmacological properties in animals. In particular, these compounds are useful as hypotensive agents, as indicated by their activity in anesthetized dog tested by blood pressure measurement using a mercury manometer or transducer via a catheter inserted in the carotid or femoral artery. When so utilized, the compounds may be combined with one or more pharmaceutically acceptable carriers or adjuvants. They may be administered orally or parenterally and, depending upon the compound employed and the mode of administration, the exact dosage utilized may vary. Furthermore, compounds of Formula I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic salts, such as the succinate, benzoate, acetate, p-toluenesulfonate, benzene-sulfonate and the like. In general, satisfactory results are obtained when these compounds are administered at a daily dosage of about 1 milligram to about 25 milligrams per kilogram of animal body weight. This daily dosage is preferably administered 2 to 4 times a day, or in sustained release form. For most large mammals, the total daily dosage is from about 50 milligrams to about 150 milligrams. Dosage forms suitable for internal use comprise from about 10 milligrams to about 75 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by wt. |
|---|---|
| 1-p-chlorophenyl-3-imino - 5,6,7,8 - tetrahydro-3H-oxazolo[3,4-a]pyridine | 30 |
| Tragacanth | 2 |
| Lactose | 59.5 |
| Corn starch | 5 |
| Talcum | 3 |
| Magnesium stearate | 0.5 |

The compounds of Formula I also have use as antidepressants and for such use may be administered in the same way and in about the same dosages as for the hypotensive utility.

The following examples are provided for the purpose of illustration and not by way of limitation.

EXAMPLE 1

1-p-chlorophenyl-3-imino-5,6,7,8-tetrahydro-3H-oxazolo[3,4-a]pyridine

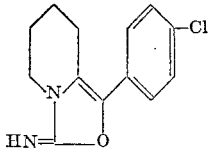

A mixture of p-chlorophenyl-2-piperidyl ketone (2.4 g.), sodium bicarbonate (0.9 g.), cyanogen bromide (1.2 g.), tetrahydrofuran (40 ml.) and water (10 ml.) is stirred for ½ hour. Water (70 ml.) and chloroform (50 ml.) are added. The chloroform layer is dried using sodium sulfate and evaporated to give an oil. A sample (1 g.) of the crude reaction product is crystallized from ether to give 800 mg. of N-cyano-p-chlorophenyl - 2-piperidyl ketone, M.P. 85–90° C. The material is allowed to stand for 24 hours and is then triturated with ether. The resultant crystals are collected by filtration to give 1.4 g. of 1 - p - chlorophenyl - 3 - amino - 5,6,7,8-tetrahydro-3H-oxazolo[3,4-a]pyridine; M.P. 144–146° C.

EXAMPLE 2

1-phenyl-3-imino-5,6,7,8-tetrahydro-3H-oxazolo-[3,4-a]pyridine hydrochloride

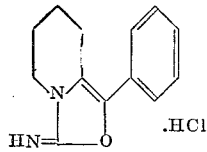

A mixture of phenyl-2-piperidyl ketone (11.1 g.), tetrahydrofuran (222 ml.), sodium bicarbonate (5.04 g.), water (25.2 ml.) and cyanogen bromide (6.6 g.) is stirred for ½ hour. The reaction mixture is diluted with ether (200 ml.) and water (100 ml.). The ether layer is dried using sodium sulfate and evaporated in vacuo to give crude N-cyano-phenyl-2-piperidyl ketone. After standing for one day this material is dissolved in ether and the solution treated with excess dry hydrogen chloride gas. The resultant mixture is treated with methanol to give a crystalline solid; 3.9 g. M.P. 226° C. The solid is crystallized from methanol-ether (1:5) to give 3.2 g. of 1-phenyl-3-imino-5,6,7,8 - tetrahydro-3H-oxazolo[3,4-a]pyridine hydrochloride; M.P. 239° C.

What is claimed is:

1. An oxazolopyridine of the formula:

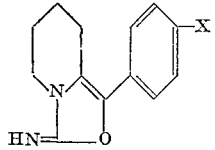

where X represents hydrogen or chloro, or a non-toxic pharmaceutically acceptable acid addition salt thereof.

2. An oxazolopyridine of claim 1 which is 1-p-chlorophenyl - 3 - imino - 5,6,7,8 - tetrahydro - 3H - oxazolo [3,4-a]pyridine.

3. An oxazolopyridine of claim 1 which is 1-phenyl-3-imino - 5,6,7,8 - tetrahydro - 3H - oxazolo[3,4-a]pyridine hydrochloride.

4. A compound of the formula:

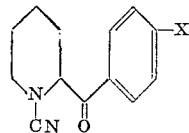

where X is hydrogen or chloro.

5. A compound of claim 4 which is N-cyano-p-chlorophenyl-2-piperidyl ketone.

References Cited

UNITED STATES PATENTS

| | | | |
|---|---|---|---|
| 1,915,334 | 6/1933 | Salzberg et al. | 260—243 |
| 2,075,593 | 3/1937 | Salzberg et al. | 167—22 |

FOREIGN PATENTS

| | | |
|---|---|---|
| 995,964 | 6/1965 | Great Britain. |

OTHER REFERENCES

J. Med. & Pharm. Chem., vol. 5, 1962, Villani et al. pp. 373–79.

Burger, Medicinal Chemistry, vol. 1, 1951, pp. 38, 39, 44, 45, and 48.

HENRY R. JILES, Primary Examiner

S. D. WINTERS, Assistant Examiner

U.S. Cl. X.R.

424—267